(12) United States Patent
Mase

(10) Patent No.: US 7,794,811 B2
(45) Date of Patent: Sep. 14, 2010

(54) PROTECTIVE FILM FOR ELECTRONIC DEVICE

(75) Inventor: Ryoichi Mase, Tokyo (JP)

(73) Assignee: Power Support Co., Ltd., Tokyo (JP)

( * ) Notice: Subject to any disclaimer, the term of this patent is extended or adjusted under 35 U.S.C. 154(b) by 348 days.

(21) Appl. No.: 11/685,054

(22) Filed: Mar. 12, 2007

(65) Prior Publication Data

US 2007/0212508 A1 Sep. 13, 2007

Related U.S. Application Data

(63) Continuation-in-part of application No. 11/322,769, filed on Dec. 30, 2005, now abandoned, which is a continuation-in-part of application No. 11/376,900, filed on Mar. 16, 2006, now abandoned.

(30) Foreign Application Priority Data

Feb. 4, 2005 (JP) ............................. 2005-001143

(51) Int. Cl.
*B32B 9/00* (2006.01)
*B32B 1/00* (2006.01)
*B32B 3/30* (2006.01)
*G09F 3/00* (2006.01)

(52) U.S. Cl. ...................... 428/40.1; 428/42.2; 428/43; 428/174; 428/179

(58) Field of Classification Search ............... 428/40.1, 428/42.1, 42.2, 43, 174, 179, 187; 174/66
See application file for complete search history.

(56) References Cited

U.S. PATENT DOCUMENTS 3,971,866 A * 7/1976 Johnson ..................... 428/41.4
4,889,754 A * 12/1989 Vargas ....................... 428/41.4
4,929,486 A * 5/1990 Itou et al. ...................... 428/77

* cited by examiner

*Primary Examiner*—Patricia L Nordmeyer
(74) *Attorney, Agent, or Firm*—Apex Juris, pllc; Tracy M Heims

(57) ABSTRACT

A protective film that covers a switch surface of an electronic device. The protective film has a first film with an adhesive surface to cover a surface of the electronic device and a second film superposed thereon to cover a predetermined area of the electronic device and the film may have one or more ribs incorporated into the film. The protective film provides various advantages such as excellent scratch resistance, antifouling and dirt or stain resistance.

7 Claims, 17 Drawing Sheets

PROTECTIVE FILM FOR ELECTRONIC DEVICE

REFERENCE TO PRIOR APPLICATION

This application is a continuation-in-part of prior application Ser. No. 11/322,769, filed on Dec. 30, 2005, now abandoned, and prior continuation-in-part application Ser. No. 11/376,900, filed on Mar. 16, 2006, now abandoned.

BACKGROUND OF THE INVENTION

1. Field of the Invention

This invention relates to a protective film for an electronic device. More particularly, this invention relates to a protective film for an electronic device, which has an adhesive layer and a non-adhesive layer to cover and protect a first control surface and/or a second control surface of the electronic device and further has at least one rib incorporated into the protective film.

2. Description of the Related Arts

A conventional screen protective film can be seen in U.S. RE35,318 to Warman. It discloses a removable and securable shield in association with such as LCD screens. The shield is removable and replaceable and includes convex peripheral edges to conform the shield to the convex screen with an extending tab formed outwardly of a single corner of the shield to enhance manual grasping thereof. To enhance securement of the shield to the associated screen, a plurality of transparent adhesive strips may be secured to an interior surface of the shield.

Due to the recent rapid development in the screen film industry, demands for screen film technology improvements are increasing. Also, the way we interact with electronics is changing and therefore the film technology must change. For example, a front surface of the electronic device may have various shapes or designs. The front surface may have a traditional flat screen surface that may include a switch surface area for turning on or off particular functions of the electronic device, and a touch sensing control surface for manually controlling the electronic device. It is a common knowledge that the protective shield covering the flat screen surface exists to cover and protect the underlying screen from being scratched or damaged. There are various types of screen covers currently being used. Also, it is common knowledge that the control and switch surfaces can easily be scratched and therefore should be protected by some means. However, the control surface can be such as a touch sensing surface and it may require a different type of protection. No conventional art suggests an effective way to achieve the demands of the current marketplace.

SUMMARY OF THE INVENTION

A feature of this invention is to provide a protective film which flexibly covers a first control surface, i.e., a switch control surface, and a second control surface, i.e., a touch sensing control surface, separately or together for their scratch protection. Several obvious advantages of this invention are to provide excellent scratch resistant effect, antifouling effect, and a dirt or stain resistant effect.

The protective film of this invention may be made of a soft material which gives a shock absorbing effect and it may be made of a transparent material which allows the user to access instructions printed on the control surface. This would also allow fingerprint scanning.

Additionally, the protective film may have at least one rib that is incorporated into the film. This rib provides several advantages including: minimizing bubbles during film placement; providing a physical, touchable guide for users; and preventing the protective film from peeling off of the electronic device.

Furthermore, this protective film may be formed by simple die cutting, which reduces the manufacturing cost. For example, one adhesive layer is superposed on a non-adhesive layer forming one double-layer film sheet thereby allowing die cutting.

To achieve the features, this invention provides a protective film comprising a first film layer which covers the touch sensing control surface and the switch control surface of the electronic device and has an adhesive surface thereon, and a second film layer, one surface thereof superposed on the adhesive surface and the other surface thereof placed on a predetermined area, e.g., the switch control surface of the electronic device. An area of the first film layer can be extended to cover a major surface of an electronic device.

The above protective film may be characterized in that the superposing areas of the first film surface and the second film surface are correspondingly shaped to match the switch control surface.

The switch control surface may be raised or may have a depression. The protective film is removable from the electronic device and resealable thereon. The protective film may have a protective shield for a screen. The protective film may be made of a flexible material and/or a transparent material. The protective film may have at least one rib incorporated into the protective film. Also, the protective film may be such that one of either layers has a surface that is not covered by the other layer.

BRIEF DESCRIPTION OF THE DRAWINGS

The above and other objects of the present invention will become readily apparent by reference to the following detailed description when considered in conjunction with the accompanying drawings wherein.

DETAILED DESCRIPTION OF THE INVENTION

Next, this invention will be explained with reference to the accompanied drawings. This invention is not limited by the examples explained herein. Also, the following explanation uses an example where the protective film is used on a portable music player; however, the usage of the protective film is not limited to such player, and this invention can be employed for use in or with various types of electronic and non-electronic devices or objects.

Figure 1:
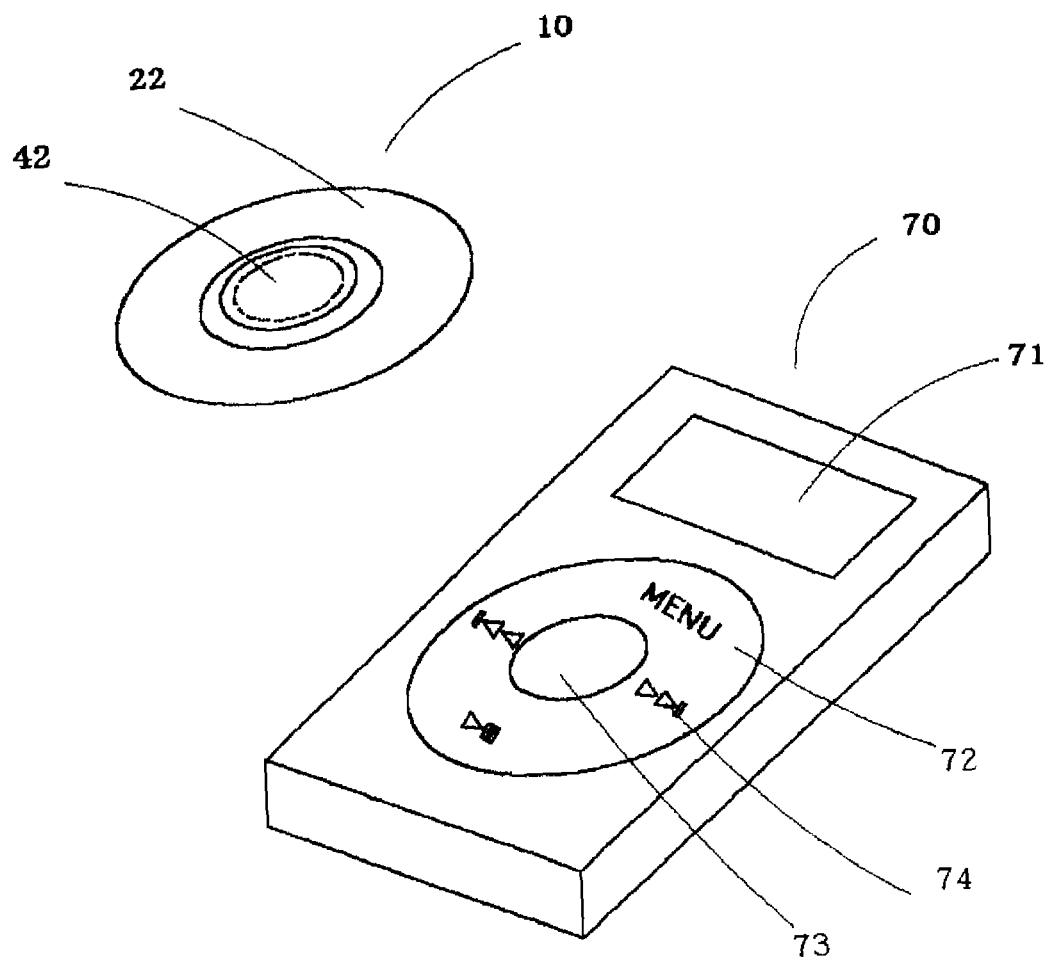
FIG. 1 is a perspective view of the portable electronic device and the protective film covering the switch control surface and the touch sensing control surface of a portable electronic device.

A first embodiment is explained with reference to FIGS. 1-3. FIG. 1 is a perspective view of the portable electronic device 70, which is mainly comprised of a display screen and a touch sensing control surface 72. A protective film 10 has a large cover surface 22 which covers a second control surface 74 of the touch sensing control surface 72 and a switch control surface cover 42 which covers a first control surface 73.

Figure 2A:
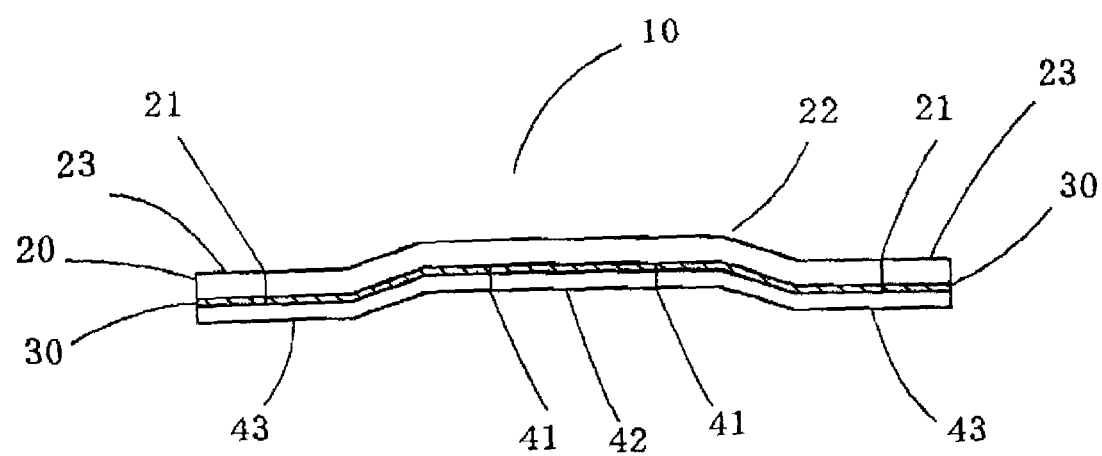
FIG. 2A is a side cross-section view of the protective film having a contoured, raised portion in the central region thereof.

FIG. 2A is the side cross-section view of the protective film 10 which comprises the first film layer 20 covering the entire touch sensing control surface 72 of the portable electronic device 70. The first film layer 20 has a first cut line 21, the large cover surface 22, and a remaining piece 23. The second layer 40 has a second cut line 41, a switch control surface cover 42, and an adhesive surface covering piece 43. There is the adhesive layer 30 between the first film layer 20 and the second film layer 40. Accordingly, the first film layer 20, the adhesive layer surface 30, and the second film layer 40 are superposed respectively to form layers, where a central region of the layers is contoured and raised. Materials to be used in the first and the second film layers 20, 40 are not particularly limited as long as a user is able to view the display screen 71 and a desired portion such as an instruction/sign on the touch sensing control surface 72 and the protective film 10 does not prevent the user from controlling the device 70 in a practical manner. Also, materials to be used in the first and second film layers 20, 40 may be the same or different. Again, materials used to create the adhesive surface 30 is not limited to a particular type as long as the first and the second film layers 20, 40 can properly stay on the electronic device 70. The first film layer 20 has the first cut line 21 that enables separation of the first film layer 20 into two pieces, i.e., the large cover surface 22 and a remaining piece 23. Similarly, the second film layer 40 has the second cut line 41 that enables separation of the second film 40 into two pieces, i.e., a switch control surface cover 42 and the adhesive surface covering piece 43.

Figure 2B:
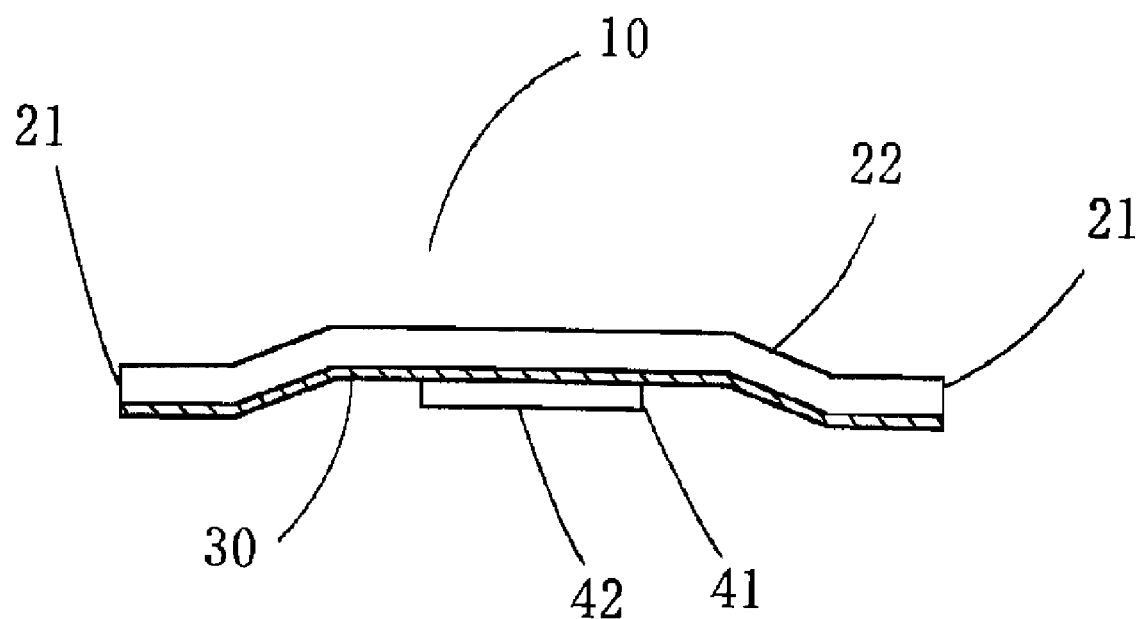
FIG. 2B is a side cross-section view of the protective film having a contoured, raised portion in the central region thereof after removing an adhesive film covering pieces therefrom.

FIG. 2B is a side cross-section view of the protective film 10 which is the first film layer 20 together with the switch control surface cover 42. As shown in FIG. 2B, when the user carefully peels the first film layer 20 from the second film layer 40 by breaking the first cut line 21, the first film layer 20, the large cover surface 22 is peeled off together with the majority of the adhesive layer 30 as separating the switch control surface cover 42 from the adhesive surface covering piece 43 by the second cut line 41. Here, the adhesive surface 30, the switch surface cover 42, and the second cut line 41 are arranged so that the switch surface cover 42 adheres to the adhesive layer 30 after the peeling process.

Figure 2C:
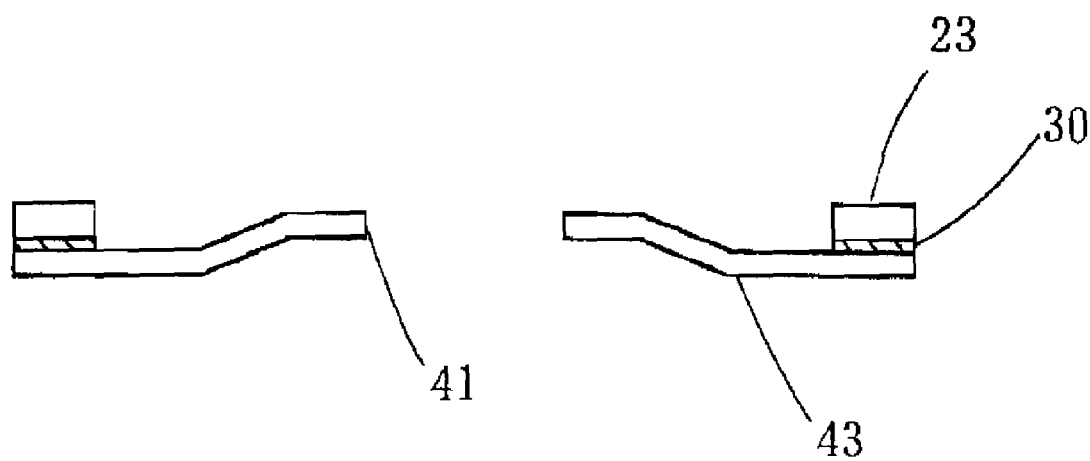
FIG. 2C is a side cross-section view of an adhesive surface covering piece and a remaining piece after peeling the protective film therefrom.

FIG. 2C is a side cross-section view of a removed the adhesive surface coving piece 43 with the remaining piece 23 after peeling the protective film 10 therefrom.

Shapes and surface areas of the first film layer 20 can be decided as necessary. For example, the first cut line 21 in FIG. 2A can be extended along a circumferential line of the second control surface 74 of the electronic device 70 in FIG. 1, so that the first film layer 20 appropriately fits over the second control surface 74. Also, the adhesive surface 30 can cover any area of the surface of the first film layer 20 as long as the first film layer 20 is securely attached on the surface of the electronic device 70 and also securely holds the later described switch surface cover 42.

Shapes and surface areas of the second layer 40 can be decided as necessary. For example, the second cut line 41 in FIG. 2A can be extended along a circumferential line of the first control surface 73 of the electronic device 70, and therefore as separating the second layer 40 into two pieces at the circumferential line, the resulting second layer 40 makes an appropriate shape to cover the first control surface 73 as shown in FIG. 1.

Figure 3:
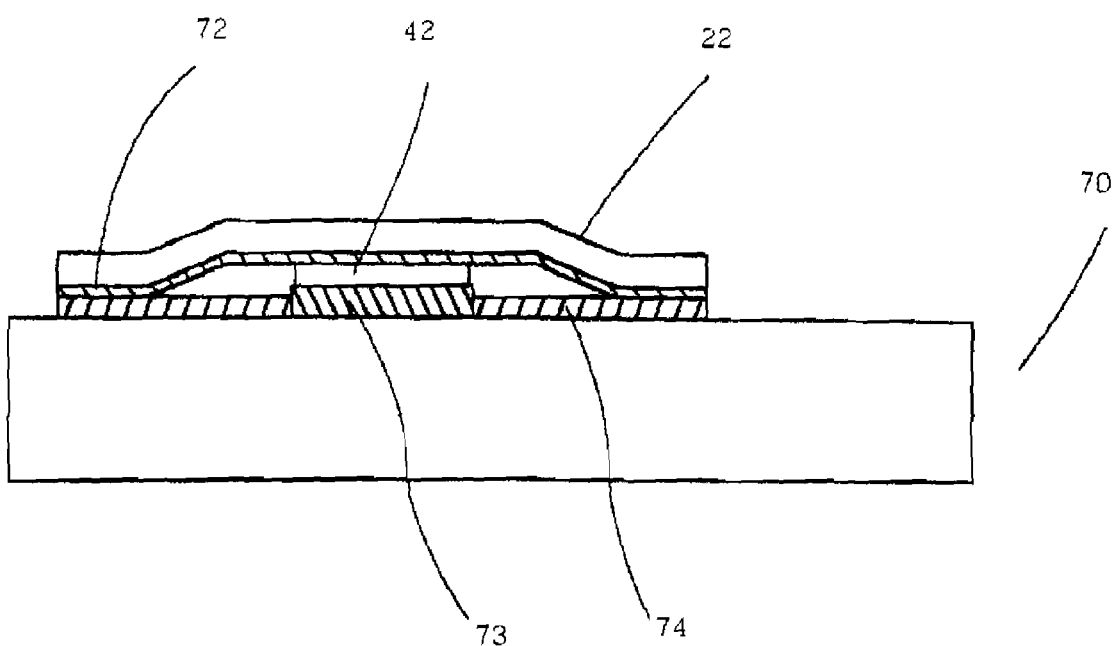
FIG. 3 is a side cross-section of the protective film, the first film layer and the second film layer are placed on the portable electronic device.

FIG. 3 is a side cross-section of the protective film 10 placed on the portable electronic device 70. As shown in FIG. 3, the portable electronic device 70 has two different surfaces for controlling the device itself, i.e., the first control surface 73 and the second control surface 74. Here, the large surface cover 22 of the first film layer is appropriately placed over the first and the second control surfaces 73, 74 and securely attached to the second control surface 74 via the adhesive surface 30. The switch surface cover 42 of the second film layer 40 is appropriately placed on the first control surface 73 of the electronic device 70. One surface of the switch surface cover 42 facing with and attaching to the first control surface 73 of the electronic device 70 is a non-adhesive surface while the other surface of the switch surface cover 42 is securely attached to the large surface cover 22 of the first film layer via the adhesive surface 30.

Figure 4:
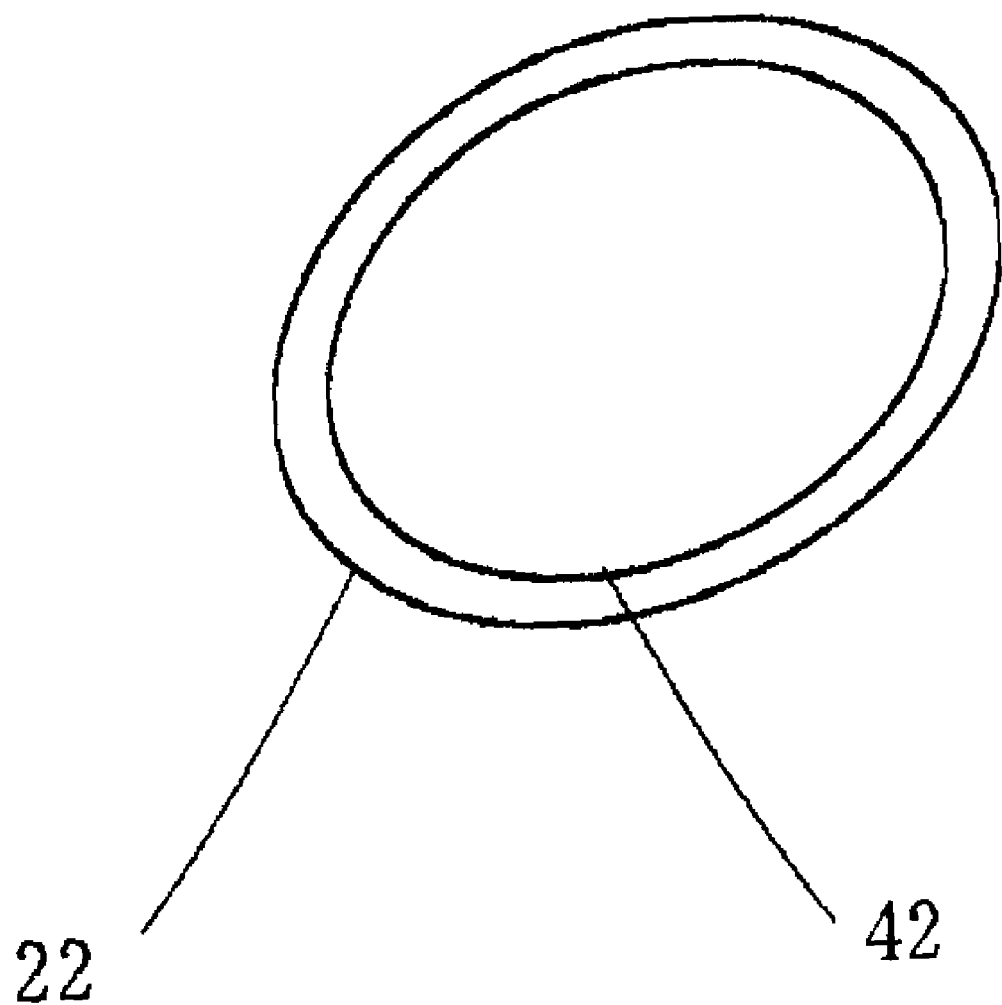
FIG. 4 is a perspective view of another embodiment of this invention where the first film layer has a smaller area and is slightly larger than the second film layer.
Figure 5:
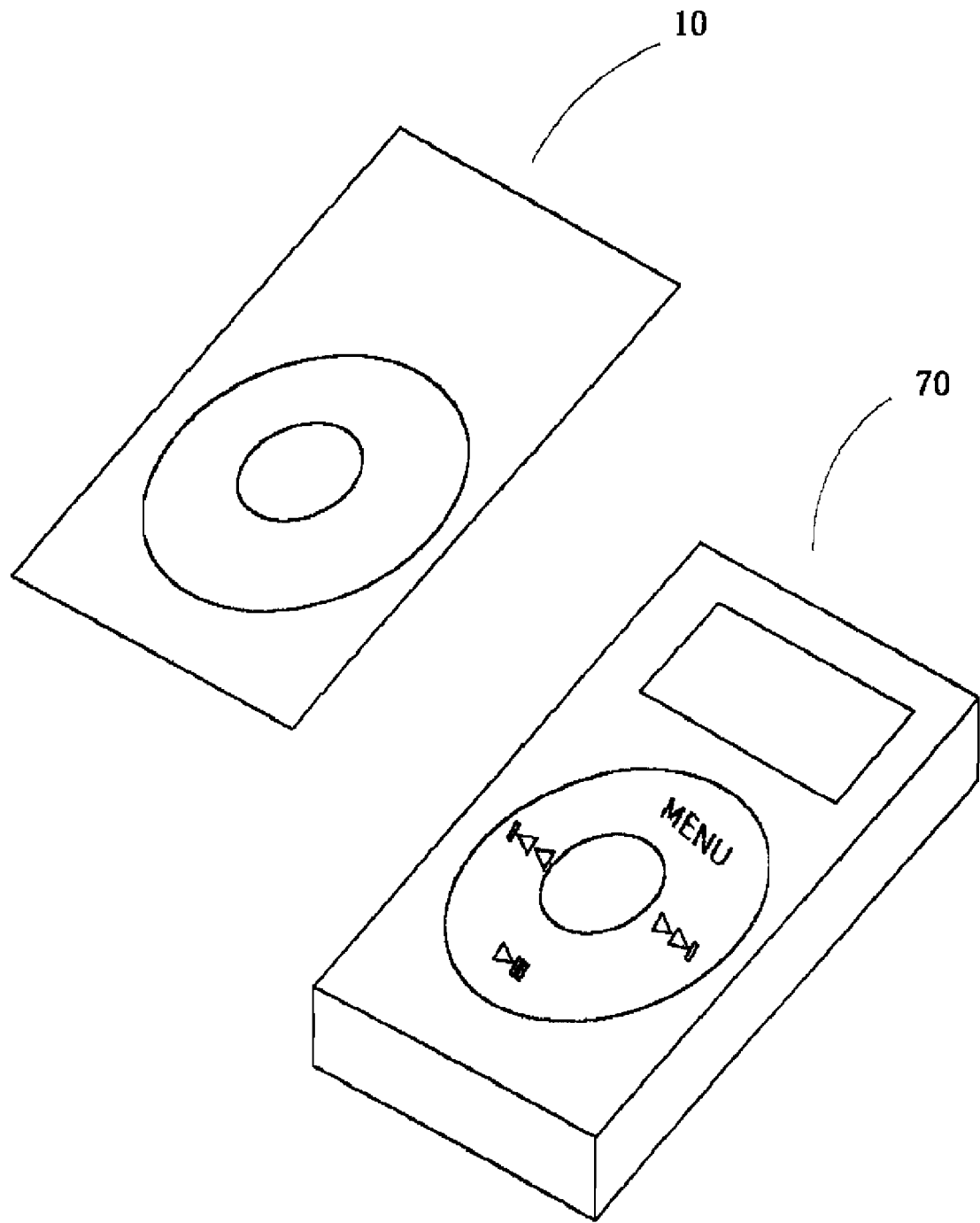
FIG. 5 is a perspective view of the protective film covering a major surface of the portable electronic device.

FIG. 4 and FIG. 5 show other embodiments of this invention. In FIG. 4, the first film layer has a smaller area and is slightly larger than the second film layer. In FIG. 5, the protective film 10 covers a major surface of the portable electronic device 70.

Figure 6A:
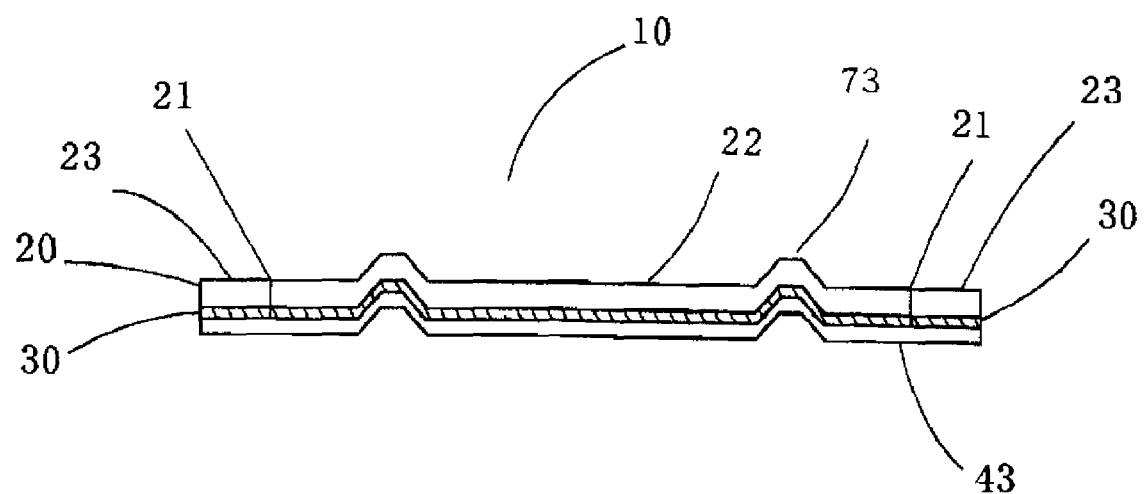
FIG. 6A is a side cross-section view of the first film layer and the second film layer with a rib.
Figure 6B:
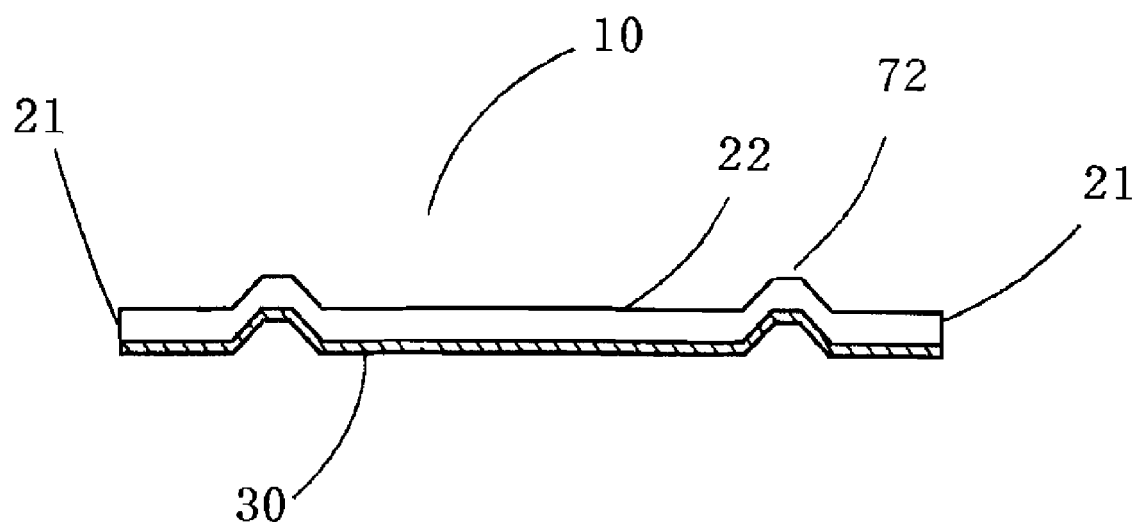
FIG. 6B is a side cross-section view of the first film layer and the second film layer with a rib after peeling the protective film therefrom.
Figure 6C:
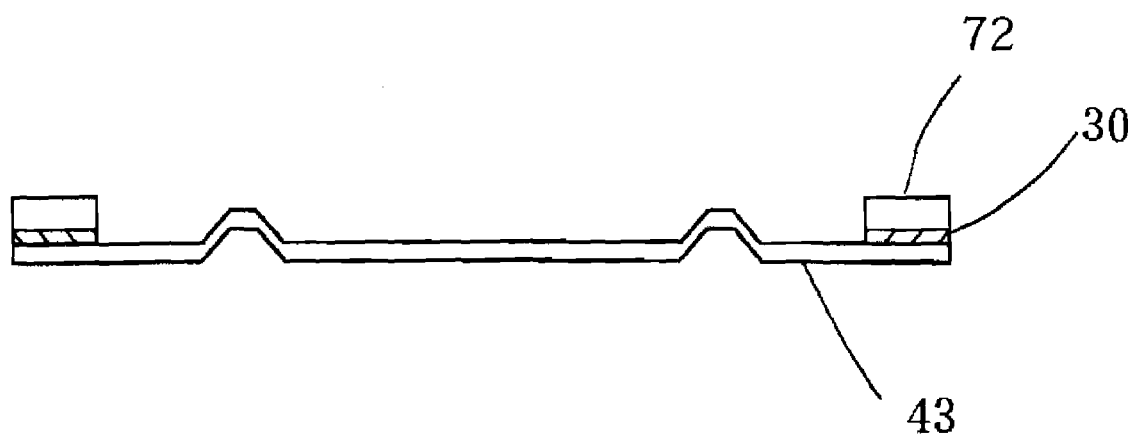
FIG. 6C is a side cross-section view of a removed film covering surface and a remaining piece with a rib after peeling the protective film therefrom.

FIG. 6 show the present invention with the addition of at least one rib 50 incorporated into the film. This rib 50 provides several advantages. First, it prevents bubbles from forming when placing the protective film 10 on the surface of the electronic device 70. It is common knowledge that bubbles tend to form between the electronic control surface 70 and the protective film 10. The rib 50 of the present invention minimizes the bubbles by providing an internal air chamber. Secondly, the rib 50 provides a physical, touchable guide for electronic device users. For example, one popular MP3 player has a touch sensitive area that forms a circle around the first and the second control surfaces 73, 74. The rib 50 of the present invention can be made so that it forms a circle around the first control surface 73 or the second control surface 74, thereby providing the user with a physical divider between the first control surface 73 or the second control surface 74, i.e., the non-sensitive switch control surface and the touch sensitive areas. Further, the shape of the rib 50 is not limited to a circle; it can be any form, such as plural curve strips or straight lines. The shape is limitless as long as the rib 50 provides the above-described advantages. The protective film 10 could have either one or more of the previously described ribs 50 incorporated into the protective film 10. Finally, the rib 50 or ribs 50 prevent the protective film 10 from peeling off of or away from the surface of the electronic device 70.

Figure 7A:
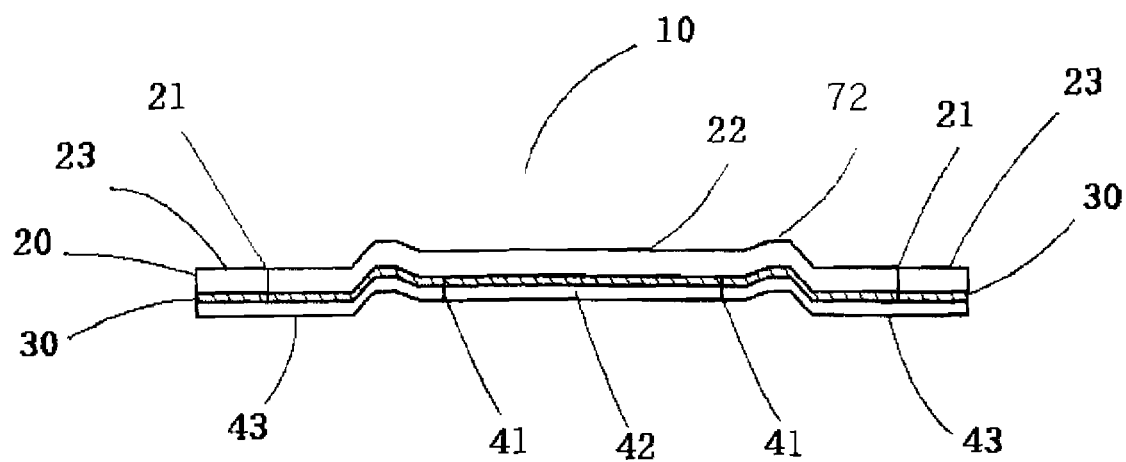
FIG. 7A is a side cross-section view of the first film layer and the second film layer with the rib and a cut line.
Figure 7B:
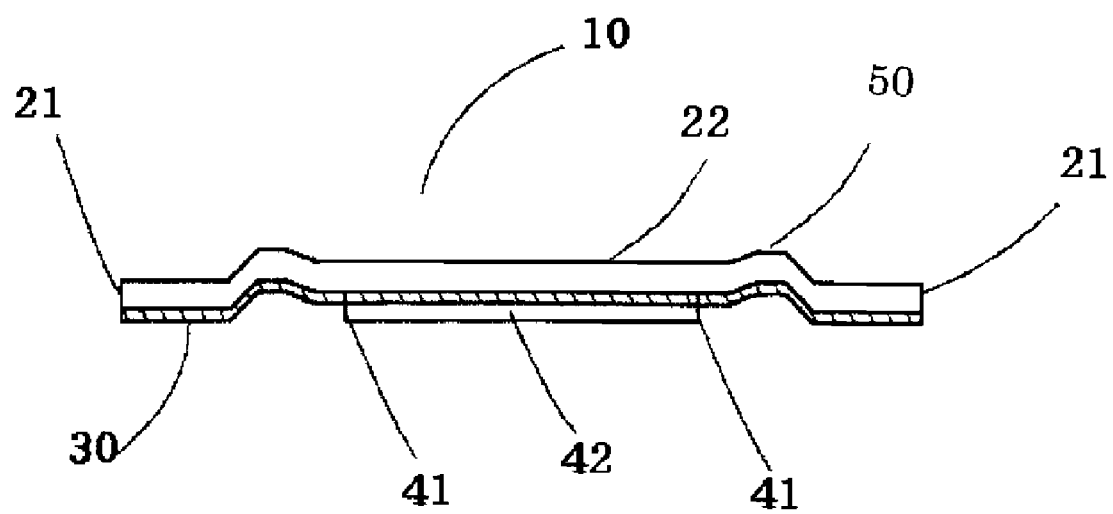
FIG. 7B is a side cross-section view of the first film layer and the second film layer with a rib and a cut line after peeling the protective film therefrom.
Figure 7C:
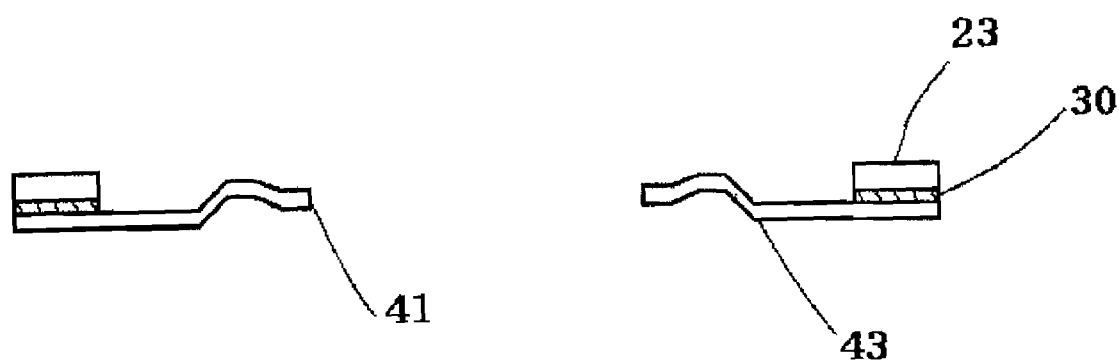
FIG. 7C is a side cross-section view of a removed film covering surface and a remaining piece with a rib and a cut line after peeling the protective film therefrom.
Figure 8A:
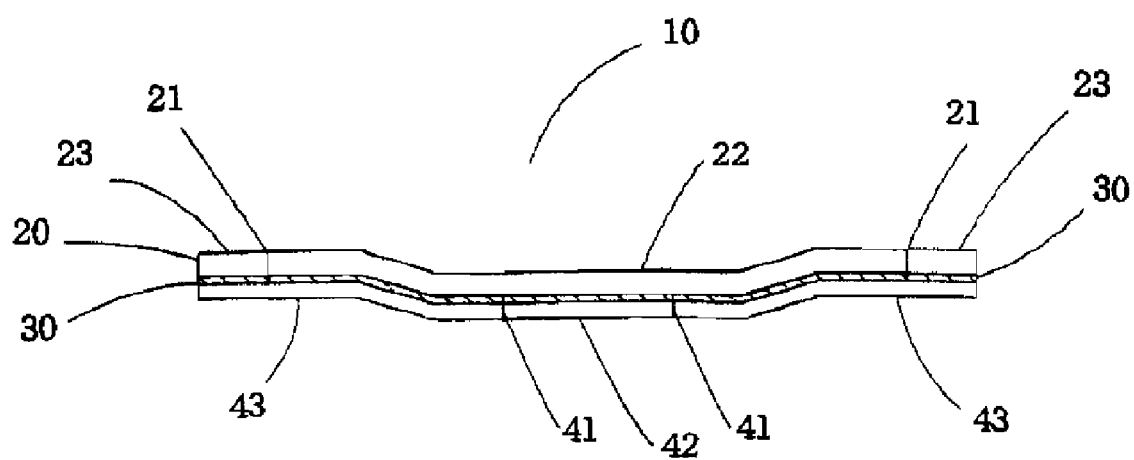
FIG. 8A is a side cross-section view of the protective film having a contoured, depression in the central region thereof.
Figure 8B:
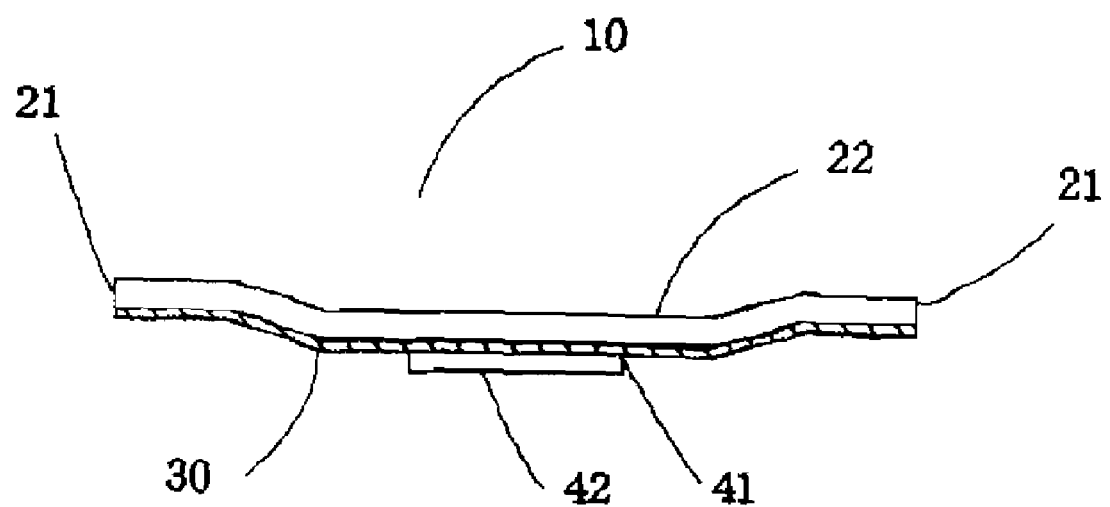
FIG. 8B is a side cross-section view of the protective film having a contoured, depression in the central region thereof after removing an adhesive film covering pieces therefrom.
Figure 8C:
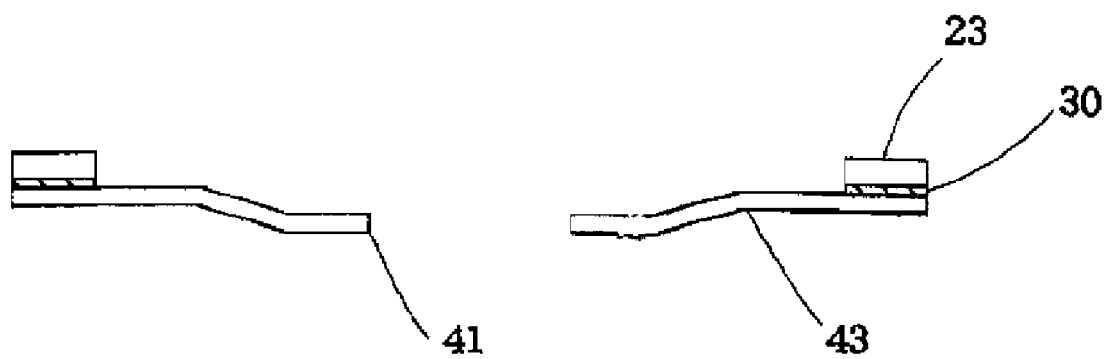
FIG. 8C is a side cross-section view of an adhesive surface covering piece and a remaining piece after peeling the protective film therefrom.
Figure 8D:
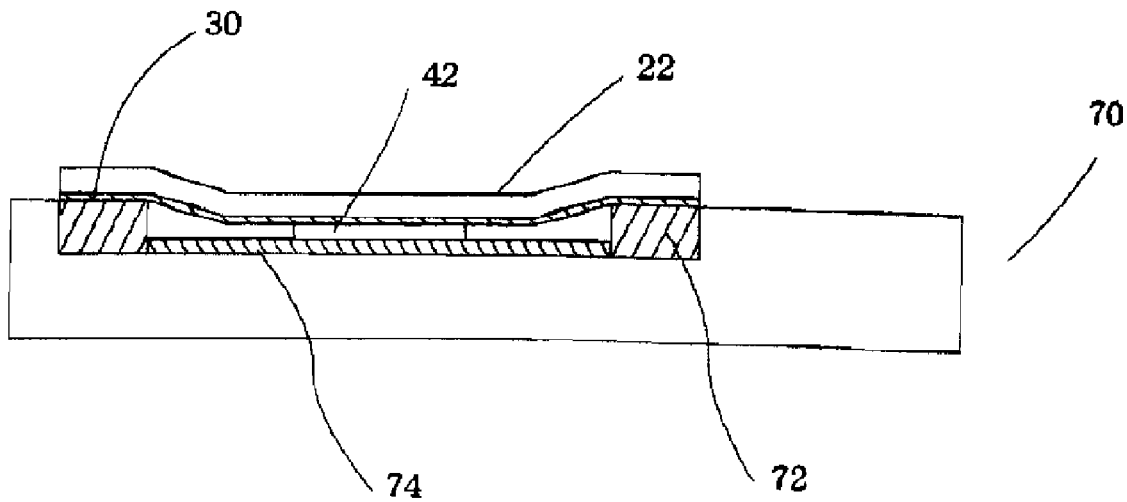
FIG. 8D is a side cross-section view of the protective film having a depression in the central region thereof which is placed on the portable electronic device.

FIG. 7 are similar to the embodiment shown in FIG. 6 except that FIG. 7 include the switch control surface cover 42.

FIG. 8 are similar to the embodiment shown in FIG. 2 except that the central region of the protective film 10 in FIG. 8 has a contoured depression instead of the contoured, raised portion to conform with a particular design of the electronic device 70.

It is readily apparent that the above-described embodiments have the advantage of wide commercial utility. It should be understood that the specific form of the invention hereinabove described is intended to be representative only, as certain modifications within the scope of these teachings will be apparent to those skilled in the art. Therefore, the protective film may be sized and shaped as necessary to fit a desirable portion of the electronic device 70 surface. For example, as shown in FIG. 4, which is the perspective view of the protective film covering the second control surface 74 of the portable electronic device 70 placed thereon, the protective film 10 can simply cover the first surface 73 only. By the same token, the protective film 10 can cover beyond the second control surface 74 of the electronic device 70. Furthermore, the material of the protective film may be flexible to provide an appropriate fitness on the electronic device 70 surface, it could be opaque material or it may be a transparent material so that the user is able to see instructions or signs marked on the electronic device 70 surface. In addition, either the first film layer 20 or the second film layer 40 may have a larger surface or a surface without the other film superposed thereon, which facilitates the user's action to remove one film layer from the other film layer. Accordingly, reference should be made to the following claims in determining the full scope of the invention.

What is claimed is:

1. A protective film used to cover the surface of an electronic device comprising:
   a contoured first film layer which covers a surface of said electronic device;
   an adhesive layer positioned between the first contoured film layer and a second matching contoured film layer;
   said second contoured film layer is removable from said adhesive layer to expose said adhesive layer,
   said second contoured film layer is cut so that an area of said second layer is removed and a second area remains so that said second area is placed on a smaller, predetermined area of said electronic device;
   wherein said first contoured film and said second contoured film are shaped in correspondence to a switching surface of said electronic device; and
   wherein said first layer, said adhesive layer and said second layer have at least one rib that is matchingly incorporated throughout all three layers of said film.

2. The protective film according to claim 1, wherein said layers are contoured such that a central region of said layers is raised.

3. The protective film according to claim 1, wherein said protective film is removable from the electronic device and resealable thereon.

4. The protective film according to claim 1, wherein said protective film is made of a flexible material.

5. The protective film according to claim 1, wherein said protective film is made of a transparent material.

6. The protective film according to claim 1, wherein one of either said first film layer or said second film layer has a surface without being superposed by the other film.

7. The protective film according to claim 1, wherein said layers are contoured such that a central region of said layers has a depression.

\* \* \* \* \*